United States Patent
Ahearn et al.

(10) Patent No.: US 10,867,459 B2
(45) Date of Patent: Dec. 15, 2020

(54) WIRELESS READER SYSTEM

(71) Applicant: Schlage Lock Company LLC, Carmel, IN (US)

(72) Inventors: John R. Ahearn, Pasadena, CA (US); Joseph W. Baumgarte, Carmel, IN (US); Gabriel D. Focke, Indianapolis, IN (US); Michael S. Henney, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/514,222

(22) Filed: Jul. 17, 2019

(65) Prior Publication Data

US 2019/0340854 A1 Nov. 7, 2019

Related U.S. Application Data

(63) Continuation of application No. 15/264,026, filed on Sep. 13, 2016, now Pat. No. 10,360,743, which is a
(Continued)

(51) Int. Cl.
 *G07C 9/00* (2020.01)
 *G07C 9/28* (2020.01)
 *H04W 12/00* (2009.01)

(52) U.S. Cl.
 CPC ........... *G07C 9/28* (2020.01); *G07C 9/00309* (2013.01); *G07C 2009/00793* (2013.01); *G07C 2209/63* (2013.01); *H04W 12/00503* (2019.01)

(58) Field of Classification Search
 CPC ................. G07C 9/28; G07C 9/00309; G07C 2009/00793; G07C 2209/63;
(Continued)

(56) References Cited

U.S. PATENT DOCUMENTS 6,172,430 B1 * 1/2001 Schmitz .................. B60R 25/04
   180/287
6,218,929 B1 * 4/2001 Furuta ................ G07C 9/00309
   340/10.1
(Continued)

FOREIGN PATENT DOCUMENTS

EP  2364006 A1  9/2011
JP  2009127336 A  6/2009
(Continued)

OTHER PUBLICATIONS

European Search Report and Written Opinion; European Patent Office; European Patent Application No. 19200648.4; Feb. 26, 2020; 16 pages.
(Continued)

*Primary Examiner* — An T Nguyen
(74) *Attorney, Agent, or Firm* — Taft Stettinius & Hollister LLP

(57) ABSTRACT

An electronic system including a mobile device that communicates with a reader device. In one embodiment, the mobile device may be configured as a mobile phone and the reader device may be configured as an electronic reader associated with an electronic lock. One or more devices in the system may determine the position of the mobile device in relation to the reader device, and cause an electronic lock or another type of access control device to perform a selected function based at least in part on the position of the mobile device in relation to the reader device.

20 Claims, 5 Drawing Sheets

Related U.S. Application Data continuation of application No. 13/969,395, filed on Aug. 16, 2013, now Pat. No. 9,443,365.

(60) Provisional application No. 61/684,110, filed on Aug. 16, 2012, provisional application No. 61/684,118, filed on Aug. 16, 2012.

(58) Field of Classification Search
CPC ............ G07C 9/00158; G07C 9/00111; G07C 9/00087; H04W 12/00503
See application file for complete search history.

(56) References Cited

U.S. PATENT DOCUMENTS

| | | | |
|---|---|---|---|
| 6,476,517 B1 * | 11/2002 | Okada | B60R 25/245 307/10.1 |
| 6,778,068 B2 | 8/2004 | Wolfe | |
| 2002/0147006 A1 | 10/2002 | Coon et al. | |
| 2002/0183008 A1 | 12/2002 | Menard et al. | |
| 2004/0178883 A1 * | 9/2004 | Haselsteiner | G07C 9/00309 340/5.72 |
| 2005/0206498 A1 | 9/2005 | Tsui et al. | |
| 2006/0014547 A1 * | 1/2006 | Walter | H04L 67/18 455/456.1 |
| 2006/0099969 A1 | 5/2006 | Staton et al. | |
| 2007/0050259 A1 | 3/2007 | Wesley | |
| 2007/0120645 A1 * | 5/2007 | Nakashima | G07C 9/00309 340/5.61 |
| 2007/0176737 A1 * | 8/2007 | Friese | B60R 25/246 340/5.61 |
| 2007/0266395 A1 | 11/2007 | Lee et al. | |
| 2008/0290990 A1 | 11/2008 | Schaffzin et al. | |
| 2009/0033459 A1 * | 2/2009 | Ichihara | E05B 77/48 340/5.28 |
| 2009/0096576 A1 * | 4/2009 | Oman | G07C 5/008 340/5.62 |
| 2009/0163140 A1 | 6/2009 | Packham et al. | |
| 2009/0167488 A1 | 7/2009 | Hays et al. | |
| 2010/0075656 A1 | 3/2010 | Howarter et al. | |
| 2010/0201536 A1 * | 8/2010 | Robertson | G07C 9/00904 340/686.6 |
| 2010/0214112 A1 * | 8/2010 | Ishihara | B60R 25/246 340/686.1 |
| 2010/0245087 A1 * | 9/2010 | Gerner | G07C 9/28 340/541 |
| 2011/0084831 A1 | 4/2011 | Tran | |
| 2011/0195699 A1 | 8/2011 | Tadayon et al. | |
| 2011/0257817 A1 * | 10/2011 | Tieman | G07C 9/00309 701/2 |
| 2011/0309933 A1 | 12/2011 | Marino | |
| 2011/0311052 A1 | 12/2011 | Myers et al. | |
| 2012/0154115 A1 | 6/2012 | Herrala | |
| 2012/0234058 A1 | 9/2012 | Neil et al. | |
| 2012/0280789 A1 | 11/2012 | Gerhardt et al. | |
| 2012/0280790 A1 | 11/2012 | Gerhardt et al. | |
| 2012/0302166 A1 | 11/2012 | Yamaoka et al. | |
| 2013/0176107 A1 | 7/2013 | Dumas et al. | |
| 2014/0043139 A1 * | 2/2014 | Humphrey | B60R 25/245 340/5.72 |
| 2014/0049361 A1 | 2/2014 | Ahearn et al. | |
| 2014/0049369 A1 | 2/2014 | Ahearn et al. | |
| 2014/0077929 A1 | 3/2014 | Dumas et al. | |
| 2014/0292481 A1 | 10/2014 | Dumas et al. | |
| 2016/0180618 A1 * | 6/2016 | Ho | G07C 9/00563 340/5.52 |
| 2016/0343182 A1 * | 11/2016 | Dumas | G07C 9/28 |

FOREIGN PATENT DOCUMENTS

| | | |
|---|---|---|
| WO | 2007079232 A2 | 7/2007 |
| WO | 2008056152 A1 | 5/2008 |

OTHER PUBLICATIONS

International Search Report; International Patent Application No. PCT/US2013/055452; dated Feb. 5, 2014; 2 pages.
International Written Opinion; International Patent Application No. PCT/US2013/055452; dated Feb. 5, 2014; 7 pages.
European Examination Report; European Patent Office; European Patent Application No. 13829775.9; dated May 31, 2018; 6 pages.
European Search Report; European Patent Office; European Patent Application No. 13829775.9; dated Apr. 4, 2016; 8 pages.
Mexican Office Action; Mexican Patent Office; Mexican Patent Application No. MX/a/2015/002067; dated Apr. 15, 2016; 3 pages.

\* cited by examiner

WIRELESS READER SYSTEM

CROSS-REFERENCE TO RELATED APPLICATIONS

The present application is a continuation of U.S. patent application Ser. No. 15/264,026 filed Sep. 13, 2016 and issued as U.S. Pat. No. 10,360,743, which is a continuation of U.S. patent application Ser. No. 13/969,395 filed Aug. 16, 2013 and issued as U.S. Pat. No. 9,443,365, which claims the benefit of U.S. Provisional Patent Application No. 61/684,110 filed Aug. 16, 2012 and U.S. Provisional Patent Application No. 61/684,118 filed Aug. 16, 2012, the contents of each application incorporated herein by reference in their entirety.

SUMMARY

One embodiment of the present invention is directed to a unique wireless reader system. Other embodiments include apparatuses, systems, devices, hardware, methods, and combinations for a wireless reader system. Further embodiments, forms, features, aspects, benefits, and advantages of the present application shall become apparent from the description and figures provided herewith.

BRIEF DESCRIPTION OF THE FIGURES

The description herein makes reference to the accompanying figures wherein like reference numerals refer to like parts throughout the several views, and wherein.

DETAILED DESCRIPTION OF ILLUSTRATIVE EMBODIMENTS

Figure 1:
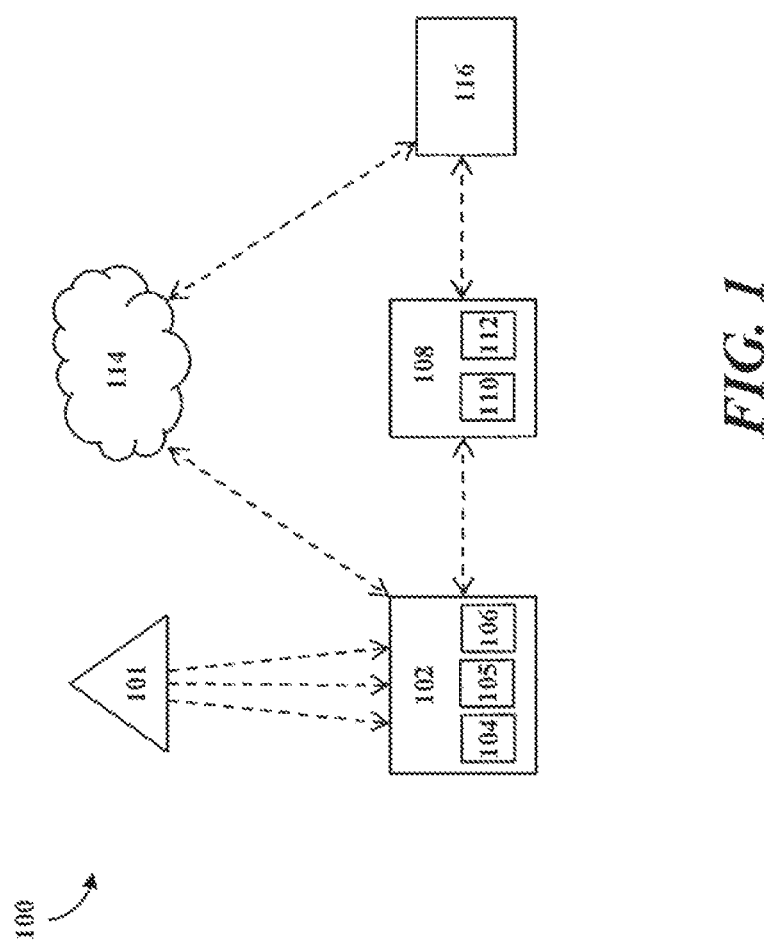
FIG. 1 is a schematic block diagram illustrating an access control system according to one form of the present invention.

For the purposes of promoting an understanding of the principles of the invention, reference will now be made to the embodiments illustrated in the drawing and specific language will be used to describe the same. It will nevertheless be understood that no limitation on the scope of the invention is hereby intended. Any alterations and further modifications in the described embodiments, and any further applications of the principles of the invention as described herein are contemplated as would normally occur to one skilled in the art to which the invention relates.

With reference to FIG. 1, illustrated therein is a system 100 according to one form of the present invention. The system 100 generally includes a mobile device 102 in wireless communication with a reader device 108. The system may further include a location determining system 101 in wireless communication with the mobile device 102, a server 114, and/or a processing system 116. In the embodiment shown in FIG. 1, the system 100 is directed to an access control system. However, other embodiments are also contemplated wherein the system 100 may be directed to a payment system, a transit system, or other types of control systems. In one aspect of the access control system 100, the location determining system 101 may be a global positioning system (GPS). However, it should be understood that other types of location determining systems 101 are also contemplated for use in association with the present invention including, for example, location determining systems that utilize cellular communication signals.

The mobile device 102 includes a transceiver 104 that allows the mobile device 102 to communicate data with another device such as, for example, the reader device 108. In the embodiment shown in FIG. 1, the mobile device 102 is a mobile phone such as, for example, a smartphone. In some embodiments, the transceiver 104 is provided with Bluetooth or Bluetooth Low Energy (BLE) capabilities. However, it is contemplated that the transceiver 104 may utilize a different communication protocol such as, for example, near field communication (NFC), Wi-Fi (e.g., Wi-Fi Direct), and/or any other appropriate communication protocol known to those skilled in the art. In other embodiments, the transceiver 104 may also be provided with GPS capabilities, or the mobile device 102 may be provided with a separate element that provides GPS capabilities. It is also contemplated that the mobile device 102 may include more than one transceiver 104. Furthermore, in some embodiments, the transceiver 104 is a passive device, while in other embodiments the transceiver 104 is an active device. In still other embodiments, the mobile device 102 may include an inertial measurement unit 105 configured to sense measure the velocity, acceleration, orientation, and/or gravitational forces of the mobile device 102. The inertial measurement unit 105 may include a single or multi-axis accelerometer, a single or multi-axis gyroscope or magnetometer, a compass, and/or any combination thereof. The measurement of acceleration may include measuring and/or determining directional acceleration.

The mobile device 102 may also include one or more applications 106 that processes data related to the location of the mobile device 102 such as, for example, data received from the location determining system 101. The application 106 may further process data relating to a credential that allows the mobile device 102 to operate one or more electronic locks which may be associated with the reader device 108, and/or data relating to the velocity, acceleration, orientation, and/or gravitational forces of the mobile device 102 as sensed by the inertial measurement unit 105. It is contemplated that the application 106 may include more than one application to carry out the various operations described in the present application.

The mobile device 102 may be configured to send secure data using the transceiver 104 and the application 106 to the reader device 108, and the reader device 108 may be configured to verify the secure data. In some embodiments, the reader device 108 is also configured to send the secure data, if verified, to the processing system 116. The processing system 116 may include a control panel, or any other control system or panel that uses a credential or unique identifier. For example, the processing system 116 may process the secure data to determine whether a user of the mobile device 102 should be allowed access to an access-restricted area. However, in some embodiments, the reader device 108 may perform the analysis and make the decisions that may otherwise be handled by the processing system 116.

In some embodiments, the processing system 116 may be a network bridge that communicates with wireless devices (not shown) for controlling and/or monitoring items in a residential home. The network bridge may receive information from the reader device 108 and cause a wireless device to perform an action based on the information. The network bridge may also report information to the server 114 and/or receive commands from the server 114.

In certain embodiments, the mobile device 102 may additionally utilize the location determining system 101 to determine the location of one or more of the reader devices 108, may store the location of one or more of the reader devices 108 in memory, and/or may download the location of one or more of the reader devices 108 from the server 114. During installation of the reader devices 108, a GPS may be used to automatically locate the reader device 108 and program data relating to the location of the reader device 108 into the access control system 100 such as, for example, into a database in the server 114. Additionally or alternatively, after installation of the reader device 108, the installer could program the reader device 108 to have knowledge of its own location, either using a GPS or by direct programming. The reader device 108 may then communicate this location to one or more of the mobile device 102, the server 114, and/or the processing system 116.

The reader device 108 is configured to communicate with the mobile device 102 to receive a credential, secure data, location information, and/or any other useful information for processing. The reader device 108 may be part of system for access control, payment, transit, vending, or other applications of interest. In the embodiment shown in FIG. 1, the reader device 108 is integrated into or used in association with an electronic lock assembly. The reader device 108 may include a transceiver 110 that allows the mobile device 102 and the reader device 108 to communicate with one another, preferably wirelessly. In some embodiments, the transceiver 110 is a Bluetooth transceiver that allows the mobile device 102 and the reader device 108 to communicate via a Bluetooth connection. It is also contemplated that the Bluetooth connection is a BLE connection.

It is contemplated that the transceiver 110 may include both a longer range communication capability and a shorter range communication capability. The longer range communication capability may, for example, be used to establish a relatively long-range connection zone in which the mobile device 102 may establish a connection with the reader device 108. The shorter range communication capability may, for example, be used to establish a relatively short-range activation zone in which the access control system 100 causes a selected function to be performed. The longer range communication capability and the shorter range communication capability may be implemented using GPS, received signal strength indication (RSSI) related, for example, to Bluetooth or BLE signal strength, and/or any other suitable technology for determining position. For example, the mobile device 102 may connect to the reader device 108 in the connection zone, and then the mobile device 102 may command the reader device 108 to lock or unlock an electronic lock associated with the reader device 108 when the mobile device 102 is in the activation zone. The reader device 108 may also include an application 112 that processes data related to the mobile device 102. It is contemplated that the application 112 may include more than one application to carry out the various operations described in the present application.

When in communication with the reader device 108, the mobile device 102 may communicate data relating to the relative position of the mobile device 102 so that the reader device 108 can make one or more decisions based on the relative position of the mobile device 102. The mobile device 102 may be in direct communication with the reader device 108, or the communication may be routed to the reader device 108 through one or more intermediate devices such as, for example, the server 114 and/or the processing system 116. Furthermore, the decisions may be made locally by the reader device 108, or by another device which has access to the data relating to the relative position of the mobile device 102. For example, the decisions may be made by one or more of the mobile device 102, the server 114, and/or the processing system 116. It is also contemplated that the server 114 may provide a cloud service such as, for example, a cloud-based intelligent home system that allows a user to control, interact with, and/or monitor devices in a residential home via the server 114.

Given the ability of a smart mobile device 102 (such as a smartphone or smart credential) to communicate relative position and speed, an estimate of when a user would be in close proximity to the reader device 108 and/or would need to interact with the reader device 108 can be calculated. This ability can provide not just an auto-unlock feature, but also an auto-open feature or other types of features that are automatically performed such as, for example, wirelessly transmitting a message to a wireless device, locking a door, opening a door, closing a door, ringing a doorbell, or automatically performing any other desired feature. In one non-limiting embodiment, a user may carry the mobile device 102 on his/her person such that the location and speed of the user can be determined via determining the location and speed of the mobile device 102. The access control system 100 may utilize this data to calculate/estimate when the user will arrive at the associated reader device 108.

In some forms, the calculation/estimation is performed once the mobile device 102 is within a pre-determined range of an associated reader device 108. The reader device 108 may then automatically unlock a door (or another type of access control device) as the user arrives at the reader device 108. Other functions/features may also be incorporated into the system such as, for example, automatically opening a door that is associated with the reader device 108, automatically closing a door, locking a door recently used, or any combination thereof.

The access control system 100 may also utilize the location determining system 101 to determine if the mobile device 102 needs to actively search for locks to unlock. The application 106 can know which sites' locks it is allowed to unlock, and if it is not within a predetermined range of those sites, then the application can auto-disable to save battery life. For example, if a mobile device 102 is out of range of any associated lock/reader devices 108, then the application 106 may command the mobile device 102 to stop looking for these associated lock/reader devices 108, and may shut down or power down the wireless connection in order to conserve battery life on the mobile device 102.

Use of the location determining system 101 can also allow certain commands to automatically be sent to the reader device 108. For example, if a user carrying a mobile device 102 walks through the door, the mobile device 102 could be configured to auto-lock the door (e.g., auto-privacy, auto-apartment, or any other auto-function) based upon which mobile device 102 passes through the door or in proximity to the reader device 108. The mobile device 102 may additionally or alternatively be configured to provide commands according to any custom configuration programmed into the application. The reader device 108 may additionally or alternatively be programmed to do different things when different mobile devices 102 pass through the door or in proximity to the reader device 108. For example, a reader device 108 may be programmed to auto-lock when a child's mobile device 102 enters the home, but not when an adult's mobile device 102 enters the home.

In one aspect of the invention, the server 114 may communicate with the mobile device 102 over the Internet, a cellular data network, or any combination thereof. The server 114 may provide the application 106 to the mobile device 102. In the embodiment shown in FIG. 1, the server 114 is a web server. However, it is contemplated that the server 114 may be another type of server, and that the server 114 may include more than one server. It is also contemplated that the server 114 may include two or more servers that are owned and/or operated by different entities/parties.

Figure 2:
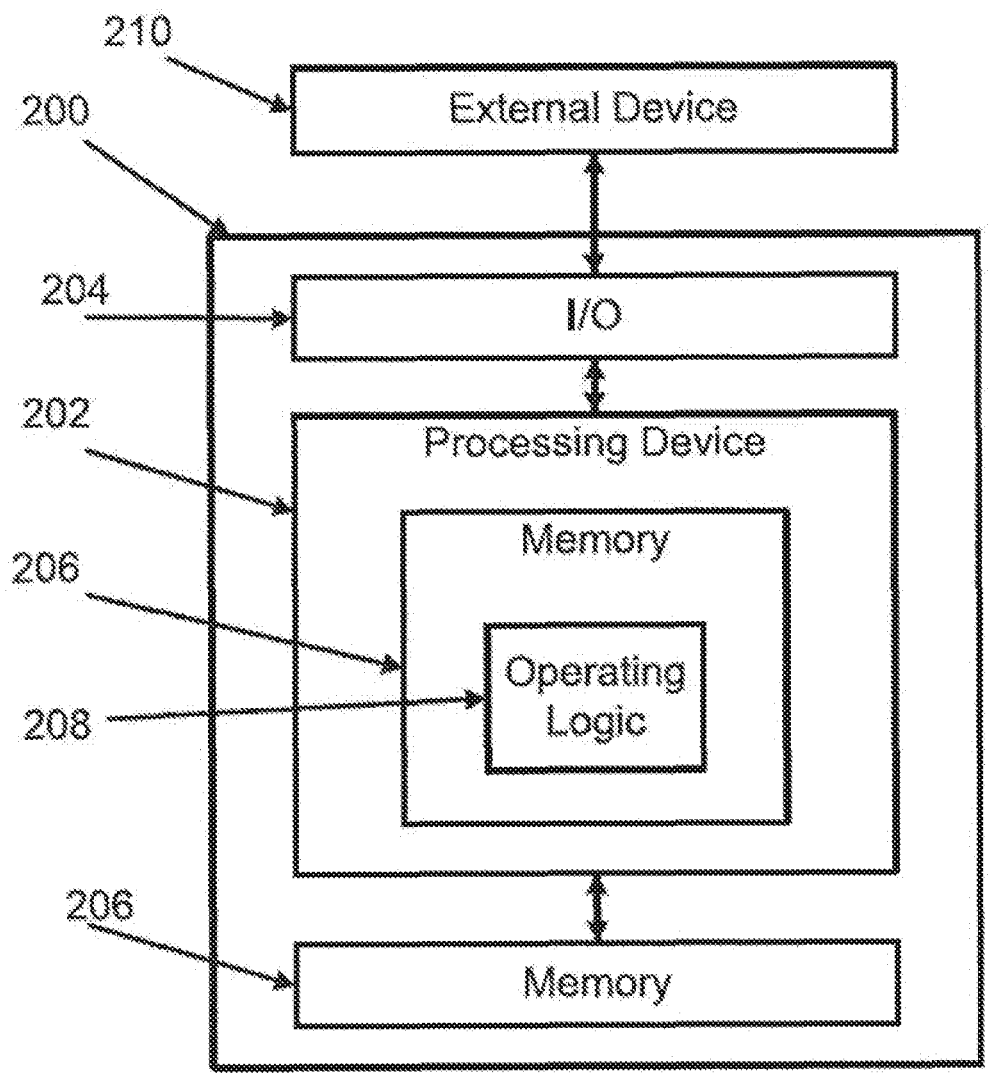
FIG. 2 is a schematic block diagram of an exemplary computing device.

FIG. 2 is a schematic block diagram of a computing device 200 according to at least one embodiment of the present invention. The computing device 200 is one example of a mobile device, reader device, server, and/or processing system configuration that may be utilized in connection with the mobile device 102, the reader device 108, the server 114, and/or the processing system 116 illustrated in FIG. 1. The computing device 200 includes a processing device 202 that executes algorithms and/or processes data in accordance with operating logic 208, an input/output device 204 that enables communication between the computing device 200 and one or more external devices 210, and memory 206 which stores data received from the external device 210 via the input/output device 204.

The input/output device 204 allows the computing device 200 to communicate with the external device 210. For example, the input/output device 204 may include a transceiver, a network adapter, a network card, an interface, or one or more communication ports (e.g., a USB port, serial port, parallel port, an analog port, a digital port, VGA, DVI, HDMI, FireWire, CAT 5, or any other type of communication port or interface). The input/output device 204 may include hardware, software, and/or firmware. It is contemplated that the input/output device 204 may include more than one of the adapters, cards, or communication ports.

The external device 210 may be any type of device that allows data to be inputted or outputted from the computing device 200. For example, the external device 210 may be a mobile device (such as the mobile device 102), a reader device (such as the reader device 108), a handheld computer, a diagnostic tool, a controller, a computer, a server (such as the server 114), a processing system (such as the processing system 116), a printer, a display, an alarm, an illuminated indicator such as a status indicator, a keyboard, a mouse, a touch screen display, and/or other electronic equipment. Furthermore, it is contemplated that the external device 210 may be integrated into the computing device 200. It is further contemplated that there may be more than one external device in communication with the computing device 200.

The processing device 202 can be a programmable type, a dedicated hardwired state machine, or any combination thereof. The processing device 202 may further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein, or may be utilized in one or more additional applications. In the depicted form, the processing device 202 is of a programmable variety that executes algorithms and/or processes data in accordance with operating logic 208 as defined by programming instructions (such as software or firmware) stored in memory 206. Alternatively or additionally, the operating logic 208 for processing device 202 is at least partially defined by hardwired logic or other hardware. The processing device 202 may include one or more components of any type suitable to process the signals received from input/output device 204 or from other components or devices, and to provide desired output signals. Such components may include digital circuitry, analog circuitry, or a combination of both.

Memory 206 may be of one or more types of non-transitory computer-readable media, such as a solid-state variety, electromagnetic variety, optical variety, or a combination of these forms. Furthermore, memory 206 can be volatile, nonvolatile, or a combination of these types, and some or all of memory 206 can be of a portable variety, such as a disk, tape, memory stick, cartridge, or the like. Additionally, memory 206 can store data that is manipulated by the operating logic 208 of processing device 202, such as data representative of signals received from and/or sent to the input/output device 204 in addition to or in lieu of storing programming instructions defining operating logic 208, just to name one example. As shown in FIG. 2, memory 206 may be included with the processing device 202 and/or coupled to the processing device 202.

Figure 3:
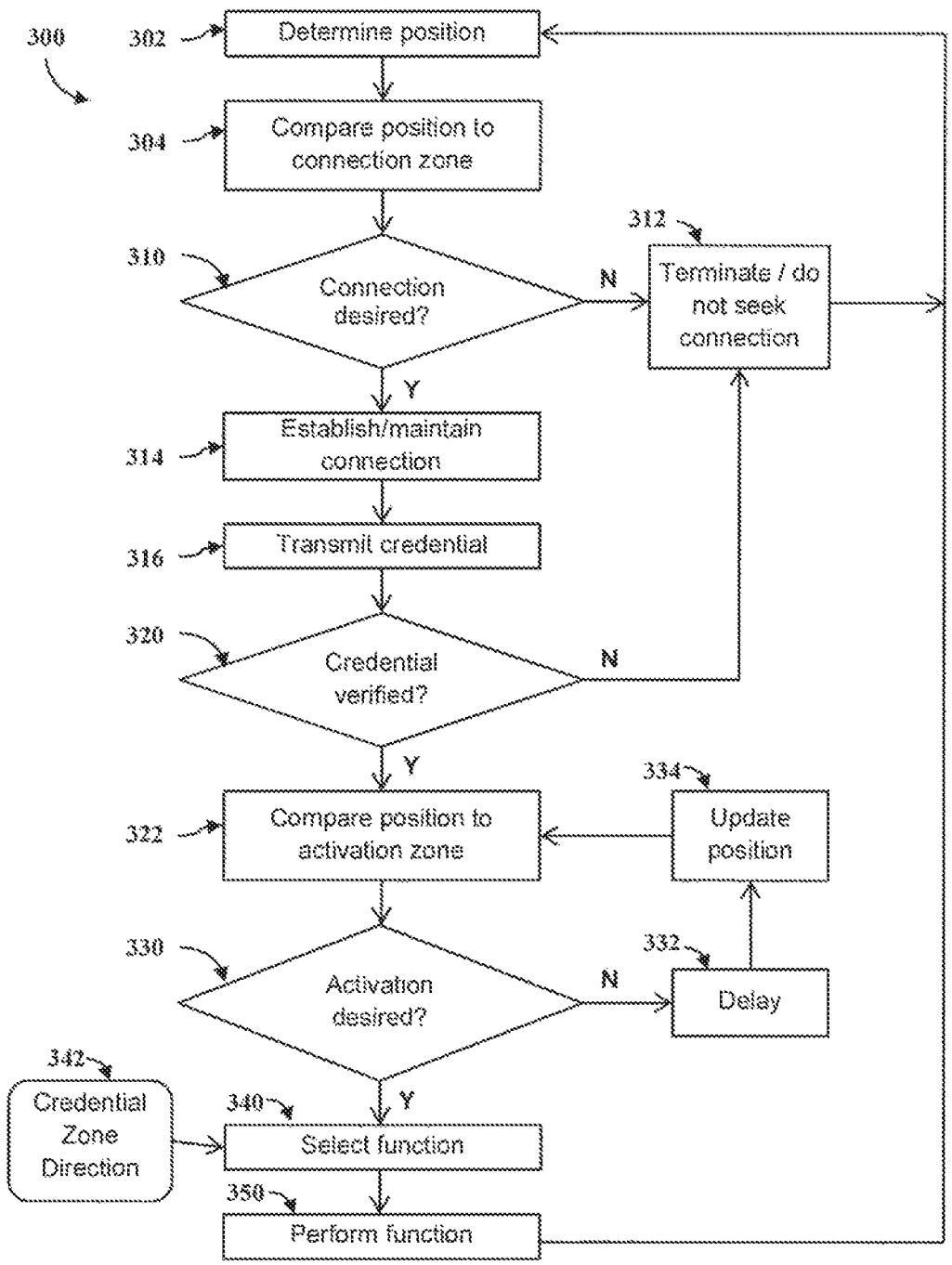
FIG. 3 is a schematic flowchart of an exemplary process for operating a lock.

With reference to FIG. 3, an exemplary process 300 which may be performed using access control system 100 is illustrated therein. Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or steps performed in the process 300 may be performed wholly by the mobile device 102, the reader device 108, the server 114, and/or the processing system 116, or that the operations or steps may be distributed among one or more of the elements and/or additional devices or systems which are not specifically illustrated in FIGS. 1-3.

FIG. 3 illustrates a schematic flow diagram of the exemplary process 300, including determining whether a connection is desired between the mobile device 102 and the reader device 108, verifying the credentials of the mobile device 102 and/or user, determining whether activation of the reader device 108 and/or another apparatus is desired, selecting the function to be performed, and performing the function.

The process 300 begins at operation 302 in which the mobile device 102 and/or the reader device 108 determines the position of the mobile device 102. The mobile device position may be determined, for example, using a location determining system such as GPS, RSSI, and/or any other suitable technology or systems for determining position.

The process 300 then proceeds from operation 302 to operation 304. At operation 304, the mobile device 102 and/or the reader device 108 may compare the determined location to a connection zone in which a connection between the mobile device 102 and the reader device 108 may be established.

The process 300 then proceeds from operation 304 to operation 310. In operation 310, the mobile device 102 and/or the reader device 108 determines whether connection between the mobile device 102 and the reader device 108 is desired, based at least in part upon the comparing performed in operation 304. The determining in operation 310 may be based upon the position of the mobile device 102. For example, if the mobile device 102 is not positioned within the connection zone, it may be determined that no connection is desired 310N, in which case the mobile device 102 and/or reader device 108 does not seek to establish a connection for a predetermined time period in operation 312. The determining in operation 310 may also take into account one or more additional factors, such as the speed at which the mobile device 102 is traveling, and/or the direction in which the mobile device 102 is traveling.

If in operation 310 it is determined that a connection is desired 310Y, the long range communication capability of the reader device 108 attempts to identify the mobile device 102 in an operation 314. The reader device 108 may attempt to establish initial contact with the mobile device 102, and/or the mobile device 102 may attempt to establish a connection with the reader device 108. This connection may be made, for example, via Bluetooth including BLE, Wi-Fi including Wi-Fi Direct, and/or other communication protocols. As previously noted, the connection may be made directly to the reader device 108, or may be routed through an intermediate node, such as the server 114 and/or the processing system 116.

Once the connection is made between the mobile device 102 and the reader device 108, the mobile device 102 may send or transmit a credential, other secure data, and/or an identifier to the reader device 108 in operation 316. Operation 316 may include a message being transmitted from the reader device 108 to the mobile device 102, and/or the mobile device 102 transmitting credential information only after verifying that the message includes data which identifies the reader device 108 as authorized to receive credential information from the mobile device 102. Operation 316 may be performed in any manner known in the art, and the credentials may utilize encryption for enhanced security.

The credential information may include a secured code stored on the mobile device 102 and/or a PIN or passcode input by the user into the mobile device 102. If the mobile device 102 includes one or more inertial measurement units 105, the credential information may additionally or alternatively include data relating to the motion of the mobile device 102. For example, a user may make a predetermined gesture, such as waving or rotating the mobile device 102, and data from the inertial measurement unit 105 may transmitted as at least a portion of the credential information. The mobile device 102 may further be configured to transmit data relating to additional or alternative user actions. For example, the credential information may only be transmitted once the user taps a button.

The process 300 then proceeds from operation 316 to operation 320 where the credential is analyzed to determine whether the mobile device 102 is authorized to activate the reader device 108. If the credential is not verified 320N, the process 300 proceeds to operation 312, in which the connection may be terminated. The disconnecting in operation 312 may include, for example, the mobile device 102 and/or the reader device 108 ceasing to seek a connection for a predetermined time period.

If the credentials are verified 320Y, the process 300 proceeds to operation 322. At operation 322, the mobile device 102 and/or the reader device 108 may determine the current location of the mobile device 102 to determine if the mobile device 102 is in an activation zone.

Process 300 then proceeds from operation 322 to operation 330. At operation 330, the reader device 108 determines whether activation of the reader device 108 is desired based at least in part upon the results of the comparing in operation 322. The determining in operation 330 may be based entirely upon the position of the mobile device 102 in relation to the activation zone, or may take into account one or more additional factors, such as the speed of the mobile device 102 and/or the direction in which the mobile device 102 is traveling.

In the illustrated embodiment, the mobile device 102 and the reader device 108 remain in at least intermittent communication while the mobile device 102 is within the connection zone. In other embodiments, the communication may cease once the credential has been verified in operation 320Y. In such embodiments, the longer-range communication signal may be terminated, and the determining operation 330 may be performed once the shorter-range signal reacquires the mobile device 102 in the activation zone. Alternatively, the longer-range communication capability may operate in a reduced-power mode in which the longer-range communication signal establishes the activation zone. In either case, the reader device 108 may include a time-out feature which returns the longer-range communication signal to full power if the mobile device 102 does not enter the activation zone within a predetermined time period. Alternatively, the time-out feature may indicate that activation is not desired 330N, and the process may continue as in the illustrated process 300.

If it is determined that activation is not desired 330N, the process 300 proceeds to operation 334. In operation 334, the position of the mobile device 102 is updated, and the process 300 returns to the operation 322 in which the newly updated position is compared to the activation zone. The process 300 may also include a delay 332 between determining that activation is not desired 330N and the updating operation 334. The duration of the delay may be based, for example, upon the distance between the current position of the mobile device 102 and the activation zone, the speed of the mobile device 102, and/or the direction in which the mobile device 102 is traveling. For example, if the mobile device 102 is traveling toward the reader device 108 at a low rate of speed, the delay 334 may be of a greater duration than if the mobile device 102 is traveling toward the reader device 108 at a high rate of speed.

If it is determined that activation is desired 330Y, the process 300 proceeds to an operation 340. In operation 340, a function to be performed by the reader device 108 and/or any other devices in the access control system 100 is determined or selected. In the illustrated process 300, the selecting in operation 340 is performed after the determining in operation 330. In other embodiments, the process may utilize the time between the communication being established in operation 314 and the determining that activation is desired 330Y to perform operation 340. Furthermore, the function to be performed may be the same for some or all of the conditions (in which case operation 340 may be omitted), or may be selected based upon one or more criteria 342, such as the credential presented, the activation zone in which the mobile device is positioned, and/or the direction in which the mobile device 102 is traveling.

In certain embodiments, the selecting in operation 340 is based at least in part upon the credential provided to the reader device 108 during the credential transfer in operation 316. In such embodiments, a first credential may result in a first function being selected in operation 340, while a second credential may result in a second function being selected in operation 340. By way of non-limiting example, if the reader device 108 is associated with an electronic lock, the first function may be include unlocking the lock, and the second function may include ringing a doorbell, turning on a light, opening a garage door, and/or sending an alert to a homeowner that the person to whom the second credential was issued has arrived. It is contemplated that multiple functions may be performed based on a single credential being transmitted to the reader device 108.

The selecting in operation 340 may be further based on various aspects of the credential information. For example, if the credential information includes both a secure code and a gesture, the secure code in combination with a first gesture may result in a first function being selected, and/or the secure code in combination with a second gesture may result in a second function being selected. In this manner, the user of each mobile device 102 may cause different functions to be selected and performed based on personalized gestures, PIN codes, and/or passwords.

The selecting in operation 340 may additionally or alternatively be based at least in part upon the activation zone in which the mobile device 102 is positioned. For example, the reader device 108 may recognize or establish multiple activation zones, in which case a first function may be selected when the mobile device 102 is in a first activation zone, and a second function may be selected when the mobile device 102 is in a second activation zone.

In further embodiments, the selecting in operation 340 may additionally or alternatively be based at least in part the position and/or the direction of movement of the mobile device 102. For example, a first function may be selected if the mobile device 102 is traveling toward the reader device 108, and a second function may be selected if the mobile device 102 is traveling away from the reader device 108.

Once the function has been selected in operation 340, the process 300 proceeds to operation 350. In operation 350, the function selected in operation 340 is performed. Once the function has been performed in operation 350, the process 300 may return to operation 302, in which the location of the mobile device 102 is determined, and the process 300 may begin again.

In the illustrated embodiment, the process 300 advances automatically from one operation to the next. However, it is also contemplated that the process 300 may require additional authentication between certain operations. For example, a user may be required to provide additional authentication in order to advance from one operation to the next. By way of non-limiting example, the user may be required to perform a gesture with the mobile device 102 in order to begin the selecting in operation 340, or may be required to input a PIN code to the mobile device 102 in order to begin performing the function in operation 350.

In certain embodiments, the mobile device 102 and the reader device 108 may continue to communicate for at least a portion of the time between the initial communication being established in operation 314 and the function being performed in operation 350. During this time, the mobile device 102 and/or the reader device 108 may continue to transmit data to one another, such as data relating to additional authentication procedures, software updates, and/or audits. In such embodiments, the longer the time between the initial credential presentation in operation 316 and the function being performed in operation 350, the more time is provided for computation, authentication, and encryption, for example. In further embodiments, the data may continue to be transmitted after the function is performed in operation 350 until a loss of communication between the mobile device 102 and the reader device 108. In such embodiments, if the longer-range communication signal was previously reduced in power or terminated, the signal may be returned to full strength in order to increase the amount of time before loss of communication between the mobile device 102 and the reader device 108.

The various aspects of the process 300 illustrated and described above may be implemented in operating logic 208 as operations by software, hardware, artificial intelligence, fuzzy logic, or any combination thereof, and/or at least partially performed manually by a user or operator. In certain embodiments, operations represent software elements such as, for example, a computer program encoded on a computer readable medium, wherein the mobile device 102 and/or the reader device 108 perform the described operations when executing the computer program.

Figure 4:
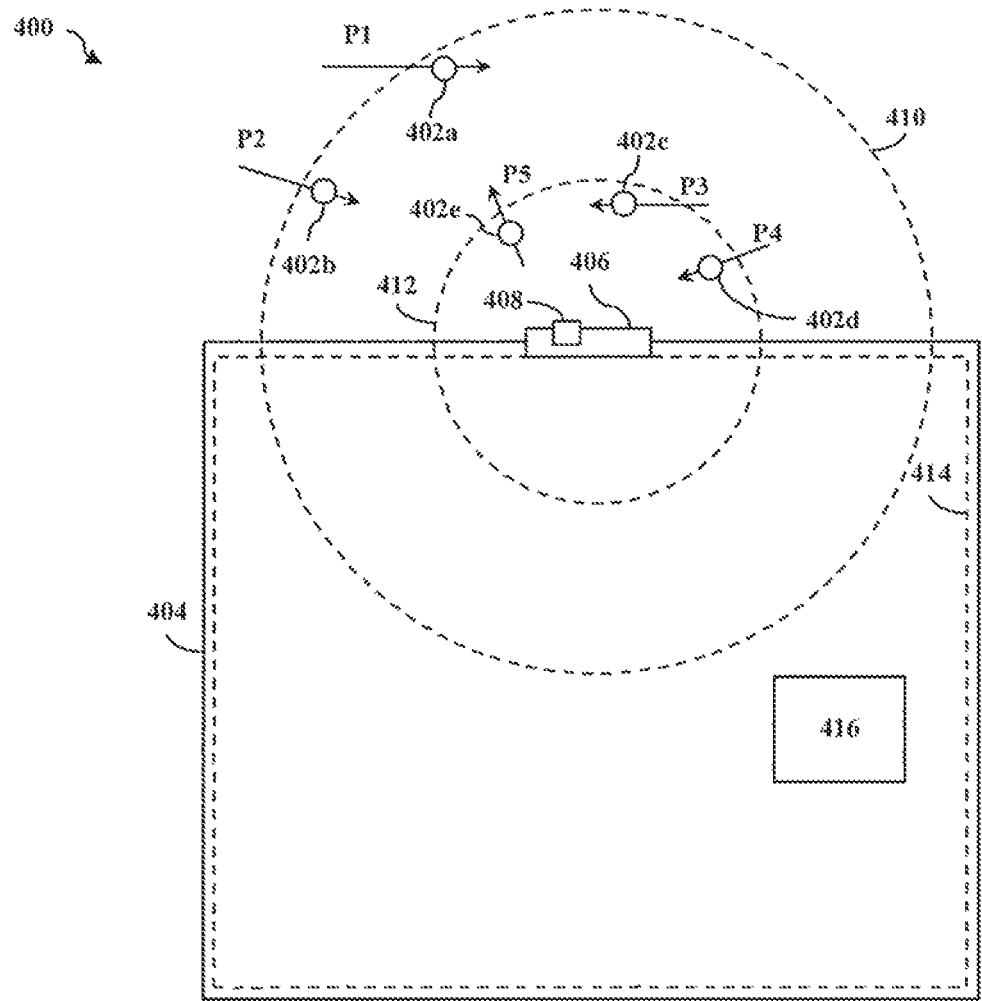
FIG. 4 is a schematic block diagram illustrating an exemplary implementation of the access control system illustrated in FIG. 1.

FIG. 4 illustrates an exemplary access control system 400 which may perform one or more operations of the process 300. It is contemplated that the access control system 400 may alternatively be configured as a payment system, transit system, and/or any other system that utilizes a credential or unique identifier. The access control system 400 includes an access-controlled region 404 accessible via a door 406 on which a reader device 408 is installed on or positioned in close proximity, a connection zone 410 in which a remote access device 402 may connect to the reader device 408, and a first activation zone 412 in which the remote access device 402 may cause a function to be activated. The system 400 may further include a second activation zone 414 such as, for example, within the access-controlled region 404. The access controlled region may be an apartment, an office, a garage, or any other region to which a user may desire to have convenient access, while still preventing access to unauthorized persons. In the illustrated embodiment, the access-controlled region 404 is a user's home, and the reader device 408 is associated with an electronic lock.

The remote access device 402 may be, for example, the mobile device 102 illustrated and described above including, for example, a smartphone, a fob, a tablet, a laptop computer, a smartcard, or any other device capable of establishing a communication connection with the reader device 408. Furthermore, the reader device 408 may be provided with a capability of communicating with multiple types of remote access devices 402. In the embodiment illustrated in FIG. 4, the remote access device 402 is a smartphone having a GPS capability such that the remote access device 402 can determine its position, and a BLE capability such that the remote access device 402 can communicate with the reader device 408. It is also contemplated that the remote access device 402 may include only one of these capabilities, or that the remote access device 402 may include other capabilities in addition to or in lieu of one or more of these capabilities.

The reader device 408 may include a longer-range communication capability and a shorter-range communication capability. The longer-range communication capability may, for example, be used to communicate with the remote access device 402 when the remote access device 402 is in the connection zone 410. The shorter-range communication capability may, for example, be used to communicate with the remote access device 402 when the remote access device 402 is in the activation zone 412.

In the system 400, the remote access device 402 determines its position in relation to the reader device 408, for example, by processing position data received via the GPS capability, or RSSI data received and/or determined via the BLE capability. For example, the remote access device 402 may determine its location via the GPS, and compare that location to the location of one or more known reader devices 408 to determine if a connection should be established with a reader device 408. Additionally, the remote access device 402 and/or the reader device 408 may be provided with a capability for determining the speed and/or direction of movement of the remote access device 402 using one or more of the GPS and/or RSSI data. For example, an increasing RSSI signal may indicate that the remote access device 402 is approaching the reader device 408, a diminishing RSSI signal may indicate that the remote access device 402 is moving away from the reader device 408, and a rapidly increasing or decreasing RSSI signal may indicate a greater speed of the remote access device 402 than a slowly increasing or decreasing RSSI signal. It is contemplated that once a connection is established, the remote access device 402 and/or the reader device 408 may reduce the transmit power their Bluetooth or BLE transceivers to conserve energy and/or to aid in determining the position of the remote access device 402.

In certain embodiments, the operation of determining whether a connection should be established may be based only on the position of the remote access device 402. For example, if the remote access device 402 and/or the reader device 408 determines that the remote access device 402 is within a connection zone 410, the remote access device 402 may attempt to establish a connection with the reader device 408 via the Bluetooth or BLE capability, or the reader device 408 may attempt to establish a connection with the remote access device 402 via the Bluetooth or BLE capability. If the remote access device 402 and/or the reader device 408 determines that the remote access device 402 is not within a connection zone 410, or has moved outside of a connection zone 410, the Bluetooth or BLE capability may be inactive or be deactivated to conserve power. When the remote access device 402 determines that it is not near a connection zone 410, the remote access device 402 may communicate this circumstance to a server such as, for example, the server 114. If the remote access device 402 is not near the connection zone 410, the reader device 408 may go into a low-power or sleep mode until the remote access device 402 approaches the connection zone 410. In one embodiment, when the reader device 402 is in a low-power or sleep mode, the Bluetooth transceiver in the reader device 408 may still be active, but other circuits in the reader device 408 may be in the low-power or sleep mode. In this way, the reader device 408 will still be able to use the Bluetooth transceiver to detect when a remote access device 402 enters the connection zone, which may then wake-up the circuitry in the reader device 408 that is in the low-power or sleep mode.

In other embodiments, the operation of determining whether a connection should be established may also take into account one or more additional factors, such as the speed at which the remote access device 402 is traveling, and/or the direction in which the remote access device 402 is traveling. For example, if the remote access device 402a is traveling along a first path P1 which crosses through the connection zone 410, but is not in the direction of the activation zone 412, the remote access device 402a and/or the reader device 408 may determine that the remote access device 402a is merely passing through the connection zone 410. This may indicate that the user carrying the remote access device 402a does not wish to approach the reader device, and that no connection should be established. If the remote access device 402b is traveling along a second path P2 in the direction of the activation zone 412, the remote access device 402 and/or the reader device 408 may determine that the user carrying the mobile device is 402b wishes to approach the reader device 408, and that a connection should be established.

After a connection is established between the remote access device 402 and the reader device 408, the remote access device 402 may transmit credential information to the reader device 408. As described above, the credential information may include data relating to a gesture, action, and/or secured code stored on the remote access device 402 and/or the reader device 408. Once the credentials are verified, the reader device 408 delays activating a function such as, for example, locking, unlocking, opening, and/or closing the door 406, until the remote access device 402 and/or the reader device 408 determines that activation is desired.

Determining whether activation is desired may be based entirely on the position of the remote access device 402 in relation to the activation zone 412, or may take into account one or more additional factors such as, for example, the speed at which the remote access device 402 is travelling and/or the direction in which the remote access device 402 is traveling. For example, if the remote access device 402c is traveling along a third path P3 which crosses through the activation zone 412, but is not in the direction of the reader device 408, the remote access device 402 and/or the reader device 408 may determine that the user carrying the remote access device 402c is merely passing through the activation zone 412, and activation is therefore not desired. If the remote access device 402d is traveling along a fourth path P4 in the direction of the reader device 408, the remote access device 402 and/or the reader device 408 may determine that the user carrying the remote access device 402d is approaching the reader device 408, and activation is therefore desired.

Once the system 400 determines that activation is desired, one or more elements of the system 400 may perform one or more functions. The functions performed may be based upon any number of factors such as, for example, the credential information of the remote access device 402, the activation zone in which the remote access device 402 is positioned, and/or the position and/or the direction of movement of the remote access device 402.

In certain embodiments, the functions performed by system 400 may be selected based, at least in part, on the activation zone in which the remote access device 402 is positioned. In embodiments which include both a first activation zone 412 and a second activation zone 414, a first function may be selected when the remote access device 402 is in the first activation zone 412, and a second function may be selected when the remote access device 402 is in the second activation zone 414. For example, when the remote access device 402 is within the first activation zone 412, the function may include automatically unlocking the electronic lock associated with the reader device 408, thereby allowing the user to enter the access-controlled region 404. If the remote access device 402 is within the second activation zone 414, the function may include automatically locking the electronic lock associated with the reader device 408 when the door closes so as to prevent unauthorized access to the access-controlled region 402 should the user forget to manually lock the door 406. Furthermore, the system 400 may be configured to recognize a hierarchy of activation zones. For example, if the remote access device 402 is positioned in an area where zones overlap, the system 400 may prioritize the functions associated with one activation zone over the functions associated with the other activation zone.

In further embodiments, the functions performed by system 400 may be selected based at least in part upon the position and/or the direction of movement of the remote access device 402. For example, if the remote access device 402d is traveling along the fourth path P4 toward the door 406, the function may include automatically unlocking the lock associated with the reader device 408, thereby allowing the user to enter the access-controlled region 404. If the remote access device 402e is traveling along a fifth path P5 away from the door 406, the function may include automatically locking the lock associated with the reader device 108 so as to prevent unauthorized access to the access-controlled region 402 should the user forget to manually lock the door 406.

Figure 5:
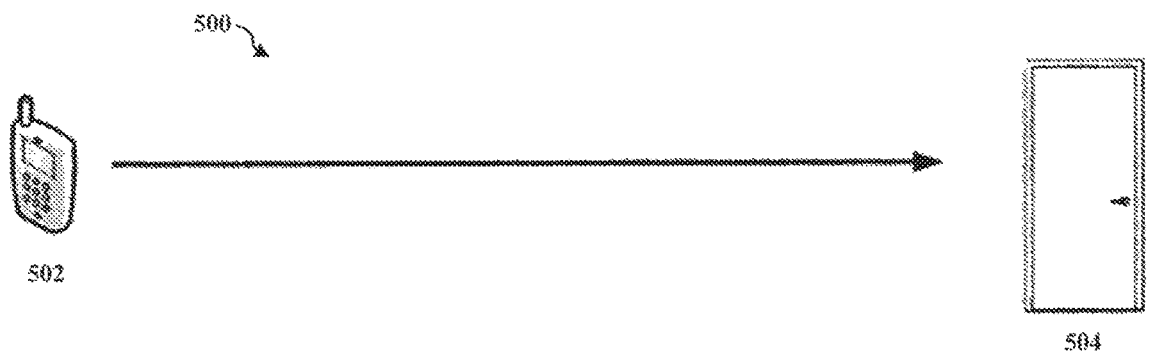
FIG. 5 is a schematic block diagram illustrating another exemplary access control system.

Referring to FIG. 5, illustrated therein an exemplary system 500 including a wireless device 502 (e.g., a smartphone) communicating with an electronic lock 504 so that the lock can pro-actively make decisions. An application may be installed on the wireless device 502 and may utilize a location determining utility such as, for example, a GPS, to determine the location of any given lock as well as the location of itself.

In one non-limiting embodiment, the location and speed of the user, through the location and speed of the wireless device 502 on their person, can be used to calculate/estimate when the user will arrive at an associated electronic lock 504. In some forms, the calculation/estimation is determined once the wireless device 502 is in a given range of an associated electronic lock 504. These features can then enable the electronic lock 504 to auto-unlock as the user arrives at the door. Other functions may also be incorporated into the system, such as but not limited to automatically opening the door, automatically closing the door behind the user, locking the door behind the user, combinations thereof, and the like.

Use of location determining utilities, such as GPS, can be used for the phone application to determine if the application needs to actively search for one or more electronic locks 504 to unlock. The application can know which sites' electronic locks 504 it is allowed to unlock, and if it is nowhere near those sites, then it can auto-disable to conserve battery life. For example, if a wireless device 502 is out of range of any of the associated electronic locks 504, then the installed application may stop looking for these associated electronic locks 504 and shut down to conserve battery life on the wireless device 502.

Use of location determining utilities can also allow certain commands to automatically be sent to the electronic lock 504. For example, if someone walks through a door including an electronic lock 504, the phone 502 could be configured to auto-lock the door (e.g. auto-privacy, auto-apartment, or another auto-function) simply based upon who passes through the door and any custom configuration programmed into the application. In other additional and/or alternative examples, the electronic lock 504 may also be programmed to do different things when different wireless devices 502 pass through the door or are positioned in proximity to the electronic lock 504. For example, an electronic lock 504 may be programmed to auto-lock when a child's wireless device 502 enters the home, but not when an adult's wireless device 502 enters the home.

Given the ability of a smart phone and/or credential to communicate relative position and speed, an estimate of when a user would be in proximity to an electronic lock 504 and/or would need to interact with an electronic lock 504 can be calculated, thereby enabling the ability of not just auto-unlock, but also auto-open or other automatic features.

Use of a GPS application in association with a wireless device 502 (such as a smart phone) can determine if the application needs to actively search for electronic locks 504 to unlock. The application can know which sites' electronic locks 504 it is allowed to unlock, and if it is nowhere near those sites, then the application can auto-disable to conserve battery life.

The GPS could also be used during installation to automatically locate the electronic locks 504 and program/add it into the system. For example, after installation of the electronic lock 504, the installer could set the electronic lock 504 up to have knowledge of its own location, either using the OPS or by programming.

Figure 6:
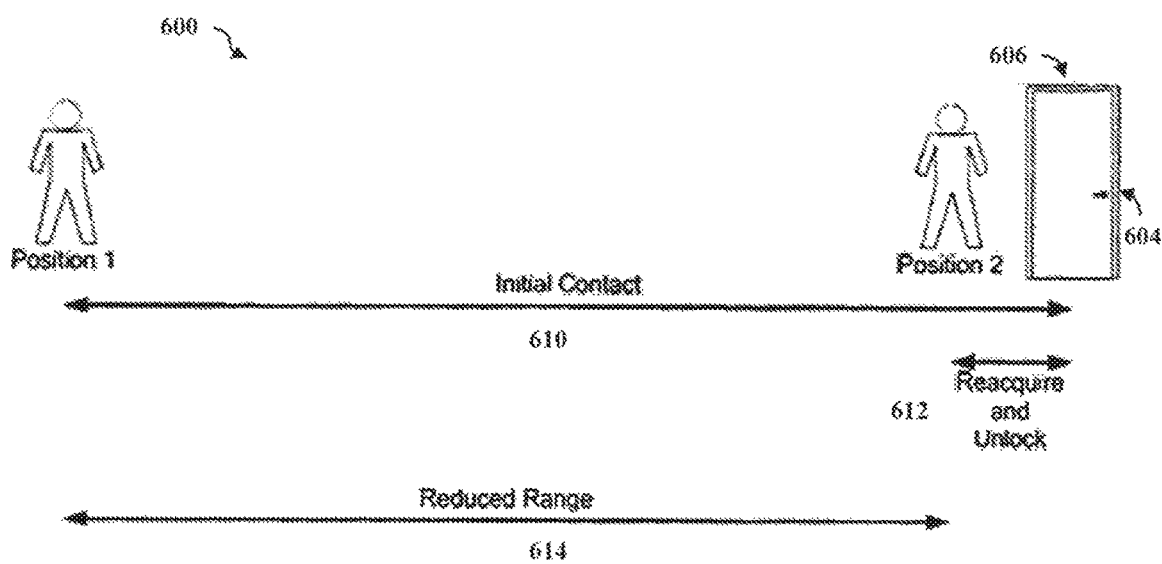
FIG. 6 is a schematic block diagram illustrating another exemplary access control system.

Referring to FIG. 6, illustrated therein is an exemplary system 600 that includes an automatic unlock device and method, and which includes communication between an electronic lock 604 and a credential in the possession of a user. In the illustrated embodiment, the electronic lock 604 is incorporated into, or positioned in close proximity to, a door 606, as shown at the far right of FIG. 6. The credential may be incorporated into a user card, for example.

The electronic lock 604 may include a long range capability. FIG. 6 illustrates one example of a long range capability. The long range is indicated by "initial contact" 610 in FIG. 6, where the credential is located, for example, at the Position 1 at the far left of the "initial contact" arrow 610. When the credential is positioned at the long range relative to the electronic lock 604, the lock's long range capability identifies (i.e., establishes initial contact with) the credential. The electronic lock 604 may then authenticate the credential.

The electronic lock 604 may also include a close proximity range capability, as further illustrated in FIG. 6. The close proximity is indicated by "reacquire and unlock" 612 in FIG. 6 where the credential is located, for example, at the Position 2 to the left of the "reacquire and unlock" arrow 612. When the credential is positioned in the close proximity range relative to the electronic lock 604, the lock's close proximity range capability automatically unlocks the electronic lock 604 to provide access through the door 606.

In an embodiment, when the credential is fully authenticated and any other activity is complete, the range at which the lock's close proximity range capability can unlock the electronic lock 604 can be reduced, as indicated by reduced range 614. In a further embodiment, the time between the initial presentation of the credential and the credential's close proximity range to the electronic lock 604 is used, for example, to authenticate, update, and/or pass audits. In still another embodiment, the time between unlocking of the electronic lock 604 and loss of communication between the electronic lock 604 and the credential may be used for continuing such updates.

In a further embodiment, the electronic lock 604 delays auto-unlock from the time of initial credential presentation until the credential is in the close proximity range to the electronic lock 604. Thus, access is restricted/delayed until a time for the user to unlock the electronic lock 604 and pass through the door 606. In another embodiment, the longer the connection between the initial credential presentation and unlocking of the electronic lock 604, the more time is provided for computation, authentication, and/or encryption.

One aspect of the present application may include a method, comprising: receiving via a reader device location information from a mobile device, wherein the location information includes GPS information indicative of a location of the mobile device, wherein the reader device and the mobile device communicate via Bluetooth communication; determining via the reader device an automatic function to perform based at least in part upon the location information; and performing via the reader device the automatic function.

Features of the aspect of the present application may include: the reader device comprises an electronic lock, the automatic function includes locking the electronic lock in response to a first location information, and unlocking the electronic lock in response to a second location information; the first location information indicates the mobile device is positioned within an access-controlled region to which the electronic lock controls access, and the second location information indicates the mobile device is within a predetermined distance of the electronic lock; the second location information further indicates the mobile device is not within the access-controlled region; the location information further includes a received signal strength indication (RSSI) information associated with the Bluetooth communication, and the determining is further based upon the RSSI information; wherein the automatic function comprises: a first automatic function performed in response to a first location information and a first RSSI information; and a second automatic function performed in response to a second location information and a second RSSI information; the reader device is an electronic lock; the first automatic function is unlocking the electronic lock, the first RSSI information indicates an increasing RSSI, the second automatic function is locking the electronic lock, and the second RSSI information indicates an decreasing RSSI.

Another aspect of the present application may include a system, comprising: a mobile device having a GPS receiver; a lock in wireless communication with the mobile device; wherein the mobile device is configured to determine location information of the mobile device based on an output from the GPS receiver and to selectively wirelessly transmit the location information to the lock; and wherein the lock is configured to wirelessly receive the location information from the mobile device, to process the location information to determine an action, and to automatically perform the action.

Features of the aspect of the present application may include: the mobile device communicates with the lock wirelessly via Bluetooth; the mobile device is a smartphone; the action includes at least one of: wirelessly transmitting a message to a wireless device, locking a door, opening a door, closing a door, and ringing a doorbell; the mobile device is configured to wirelessly receive the message from the lock via Bluetooth communication, and the mobile device is further configured to transmit credential information based on the message; the mobile device is further configured to sense at least one velocity, acceleration, orientation, and gravitational forces of the mobile device, and the credential information includes data relating to at least one of the velocity, acceleration, orientation, and gravitational forces of the mobile device; the mobile device is configured to wirelessly transmit the location information to the lock only when the location information is within a predetermined distance of the lock.

Yet another aspect of the present application may include an apparatus, comprising: a reader device configured to wirelessly receive location information from a remote access device via Bluetooth communication, to process the location information to determine an action, and to automatically perform the action; and wherein the location information includes GPS data related to a location of the remote access device.

Features of the aspect of the present application may include: the location information further includes data relating to a speed and a direction of movement of the remote access device, and wherein the action is determined at least in part upon the speed and the direction of movement of the remote access device; the information further includes credential information, and wherein the action is determined at least in part upon the credential information; the credential information includes data relating to at least one of velocity, acceleration, orientation, and gravitational forces of the remote access device; the reader device is further configured to select a first action in response to a first directional acceleration, and to select a second action in response to a second directional acceleration.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of operating an electronic lock having a long range capability and a close proximity range capability, the method comprising:
   establishing, via the long range capability of the electronic lock, an initial communication connection with a lock access credential when the lock access credential is located at a long range from the electronic lock, wherein the long range is farther than a short range from the electronic lock;
   authenticating, by the electronic lock and in response to establishing the initial communication connection with the lock access credential, the lock access credential when the lock access credential is farther than the short range from the electronic lock;
   terminating, by the electronic lock and in response to successful authentication of the lock access credential, the initial communication connection with the lock access credential via the long range capability;
   automatically establishing, by the close proximity range capability of the electronic lock and in response to terminating the initial communication connection with the lock access credential via the long range capability, a subsequent communication connection with the previously authenticated lock access credential when the lock access credential is located within the short range from the electronic lock to automatically reacquire the previously authenticated lock access credential; and
   automatically unlocking the electronic lock in response to automatically reacquiring the previously authenticated lock access credential without further authentication of the previously authenticated lock access credential.

2. The method of claim 1, wherein automatically unlocking the electronic lock comprises automatically unlocking the electronic lock based on only the automatic reacquiring of the previously authenticated lock access credential by the close proximity range capability.

3. The method of claim 1, wherein automatically reacquiring the previously authenticated lock access credential comprises automatically reacquiring the previously authenticated lock access credential when the lock access credential is located at the short range from the electronic lock.

4. The method of claim 1, further comprising restricting, by the electronic lock, an unlock capability of the electronic lock in response to terminating the initial communication connection with the lock access credential until the automatic reacquiring of the previously authenticated lock access credential by the close proximity range capability.

5. The method of claim 1, wherein authenticating the lock access credential when the lock access credential is farther than the short range from the electronic lock comprises authenticating the lock access credential when the lock access credential is at the long range from the electronic lock.

6. The method of claim 1, further comprising:
determining, by the electronic lock, a time from the initial communication connection until a user of the lock access credential will be within the short range from the electronic lock; and
delaying, by the electronic lock, an automatic unlock feature of the electronic lock for the determined time in response to authenticating the lock access credential.

7. The method of claim 1, further comprising updating at least one of the electronic lock or the lock access credential via the close proximity range capability in response to automatically unlocking the electronic lock before loss of the subsequent communication connection between the electronic lock and the lock access credential.

8. The method of claim 7, wherein updating the at least one of the electronic lock or the lock access credential comprises passing audits from the electronic lock to the lock access credential.

9. The method of claim 7, wherein updating the at least one of the electronic lock or the lock access credential via the close proximity range capability before the loss of the subsequent communication connection comprises continuing communication between the electronic lock and the lock access credential via the subsequent communication connection to update the at least one of the electronic lock or the lock access credential via the close proximity range capability until the lock access credential is farther than the short range from the electronic lock.

10. The method of claim 1, wherein automatically unlocking the electronic lock comprises automatically unlocking the electronic lock based on only automatically establishing the subsequent communication connection with the previously authenticated lock access credential by the close proximity range capability of the electronic lock.

11. An electronic lock system, comprising:
a credential; and
an electronic lock comprising a long range capability and a close proximity range capability, wherein the electronic lock is configured to wirelessly communicate with the credential via the long range capability and the close proximity range capability, and wherein the electronic lock is further configured to:
identify, by the long range capability, the credential based on an initial communication connection with the credential when the credential is located at a long range from the electronic lock, wherein the long range is farther than a short range;
authenticate the credential when the credential is farther than the short range from the electronic lock;
terminate the initial communication connection with the credential via the long range capability in response to successful authentication of the credential;
automatically reacquire communication with the previously authenticated credential by the close proximity range capability when the credential is located within the short range from the electronic lock and in response to termination of the initial communication connection with the credential via the long range capability; and
automatically unlock the electronic lock in response to automatically reacquiring the previously authenticated credential without further authentication of the previously authenticated credential.

12. The electronic lock system of claim 11, wherein to automatically unlock the electronic lock comprises to automatically unlock the electronic lock based on only automatically reacquiring of communication with the previously authenticated credential by the close proximity range capability of the electronic lock.

13. The electronic lock system of claim 11, wherein the automatically reacquiring the previously authenticated credential comprises automatically reacquiring the previously the previously authenticated credential when the lock access credential is located at the short range from the electronic lock.

14. An apparatus, comprising:
an electronic lock having a long range capability that enables communication with a credential at a long range from the electronic lock and a close proximity range capability that enables communication with the credential at a short range from the electronic lock, wherein the long range is farther than the short range, and wherein the electronic lock is configured to:
identify, by the long range capability, the credential based on an initial communication connection with the credential when the credential is located at the long range;
authenticate the credential when the credential is farther than the short range;
terminate the initial communication connection with the credential via the long range capability in response to successful authentication of the credential;
automatically reacquire communication with the previously authenticated credential by the close proximity range capability when the credential is located within the short range and in response to termination of the initial communication connection with the credential via the long range capability; and
automatically unlock a door in response to automatically reacquiring the previously authenticated credential without further authentication of the previously authenticated credential.

15. The apparatus of claim 14, wherein to automatically reacquire communication with the previously authenticated credential comprises to automatically reacquire communication with the previously authenticated credential when the credential is located at the short range.

16. The apparatus of claim 14, wherein to automatically unlock the door comprises to automatically unlocking the door based on only the automatic reacquiring of communication with the previously authenticated credential by the close proximity range capability.

17. The apparatus of claim 14, wherein the electronic lock is further configured to restrict an unlock capability of the electronic lock in response to terminating the initial communication connection with the credential until the automatic reacquiring of communication with the previously authenticated credential by the close proximity range capability.

18. The apparatus of claim 14, wherein the electronic lock is further configured to (i) determine a time from the initial communication connection until a user of the credential will be within the short range and (ii) delay an automatic unlock feature of the electronic lock for the determined time in response to authentication of the credential.

19. The apparatus of claim 14, wherein the electronic lock is further configured to update at least one of the electronic lock or the credential via the close proximity range capability in response to automatically unlocking the door before loss of communication between the electronic lock and the credential.

20. The apparatus of claim 19, wherein to update the at least one of the electronic lock or the credential via the close proximity range capability before the loss of communication comprises to update the at least one of the electronic lock or the credential via the close proximity range capability before the credential is farther than the short range from the electronic lock.

\* \* \* \* \*